(12) United States Patent
Bendlin et al.

(10) Patent No.: US 11,177,922 B2
(45) Date of Patent: *Nov. 16, 2021

(54) CONFIGURATION OF DEMODULATION REFERENCE SIGNALS IN BEAMFORMED WIRELESS COMMUNICATION SYSTEMS

(71) Applicant: AT&T INTELLECTUAL PROPERTY I, L.P., Atlanta, GA (US)

(72) Inventors: Ralf Bendlin, Cedar Park, TX (US); Thomas Novlan, Austin, TX (US); Xiaoyi Wang, Austin, TX (US); Arunabha Ghosh, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 80 days.

This patent is subject to a terminal disclaimer.

(21) Appl. No.: 16/665,167

(22) Filed: Oct. 28, 2019

(65) Prior Publication Data

US 2020/0059339 A1  Feb. 20, 2020

Related U.S. Application Data

(63) Continuation of application No. 15/867,631, filed on Jan. 10, 2018, now Pat. No. 10,505,688.

(51) Int. Cl.
*H04W 4/00* (2018.01)
*H04L 5/00* (2006.01)
(Continued)

(52) U.S. Cl.
CPC ............ *H04L 5/0051* (2013.01); *H04B 7/04* (2013.01); *H04B 7/0617* (2013.01);
(Continued)

(58) Field of Classification Search
None
See application file for complete search history.

(56) References Cited

U.S. PATENT DOCUMENTS 9,474,063 B2  10/2016  Han et al.
9,509,470 B2  11/2016  Janis et al.
(Continued)

FOREIGN PATENT DOCUMENTS

EP        3273739 A1   1/2018
WO    2014109276 A1   7/2014
(Continued)

OTHER PUBLICATIONS

International Preliminary Report on Patentability for International Application No. PCT/US2018/063118 dated Jul. 23, 2020, 20 pages.

(Continued)

*Primary Examiner* — Phirin Sam
(74) *Attorney, Agent, or Firm* — Amin, Turocy & Watson, LLP

(57) ABSTRACT

Various embodiments disclosed herein provide for efficient configuration of demodulation reference signals in beamformed wireless communications systems. In an embodiment, the transmitter can signal the location of demodulation reference signals (DMRS) by including an indicator bit in downlink control information indicating which DMRS scheme is used in the transmission. A first DMRS scheme can let the user equipment (UE) device know that the DMRS position for the PDSCH carrying the RMSI is as signaled on the master information block (MIB)—referred to as PDSCH Mapping Type A. A second DMRS scheme can let the UE device know that the DMRS position for the PDSCH carrying the RMSI is the first orthogonal frequency division multiplexing (OFDM) symbol of said PDSCH allocation—referred to as PDSCH mapping type B).

20 Claims, 12 Drawing Sheets

(51) Int. Cl.
 H04B 7/06 (2006.01)
 H04L 27/26 (2006.01)
 H04B 7/04 (2017.01)
 H04W 72/04 (2009.01)
(52) U.S. Cl.
 CPC .......... H04L 5/0023 (2013.01); H04L 5/0044 (2013.01); H04L 5/0048 (2013.01); H04L 5/0053 (2013.01); H04L 5/0094 (2013.01); H04L 27/2602 (2013.01); H04W 72/044 (2013.01); *H04L 5/0087* (2013.01); *H04L 27/2655* (2013.01); *H04W 72/042* (2013.01)

(56) References Cited

U.S. PATENT DOCUMENTS

| | | | |
|---|---|---|---|
| 9,609,647 | B2 | 3/2017 | You et al. |
| 9,648,588 | B2 | 5/2017 | Kim et al. |
| 9,698,892 | B2 | 7/2017 | Horiuchi et al. |
| 9,877,314 | B2 | 1/2018 | Seo et al. |
| 2010/0303034 | A1 | 12/2010 | Chen et al. |
| 2014/0198675 | A1 | 7/2014 | He et al. |
| 2015/0092528 | A1* | 4/2015 | Luo .................. H04W 72/0413 370/210 |
| 2015/0181572 | A1 | 6/2015 | Guo et al. |
| 2015/0256312 | A1 | 9/2015 | Yi et al. |
| 2015/0270918 | A1* | 9/2015 | Lee ................... H04L 1/0038 370/329 |
| 2016/0043849 | A1 | 2/2016 | Lee et al. |
| 2016/0057753 | A1 | 2/2016 | Vang et al. |
| 2016/0212752 | A1 | 7/2016 | Xu et al. |
| 2017/0238312 | A1 | 8/2017 | Chen et al. |
| 2017/0245229 | A1 | 8/2017 | Seo et al. |
| 2017/0280273 | A1 | 9/2017 | Xu et al. |
| 2017/0289966 | A1 | 10/2017 | Islam et al. |
| 2017/0303265 | A1 | 10/2017 | Islam et al. |
| 2017/0317794 | A1 | 11/2017 | You et al. |
| 2017/0317816 | A1* | 11/2017 | Lei ..................... H04W 48/16 |
| 2017/0331608 | A1* | 11/2017 | Luo .................... H04L 1/0028 |
| 2017/0353254 | A1 | 12/2017 | Islam et al. |
| 2017/0374637 | A1 | 12/2017 | Akkarakaran et al. |
| 2018/0048442 | A1 | 2/2018 | Sang et al. |
| 2018/0049167 | A1 | 2/2018 | Islam et al. |
| 2018/0063820 | A1 | 3/2018 | Xiong et al. |
| 2018/0332514 | A1* | 11/2018 | Maaref ............ H04W 36/0061 |
| 2018/0376454 | A1 | 12/2018 | Astrom et al. |
| 2019/0053196 | A1 | 2/2019 | Abedini et al. |
| 2019/0089474 | A1 | 3/2019 | Ly et al. |
| 2019/0149365 | A1 | 5/2019 | Chatterjee et al. |
| 2019/0159203 | A1* | 5/2019 | Kim ..................... H04W 56/00 |
| 2019/0222254 | A1 | 7/2019 | Kim et al. |
| 2019/0326986 | A1* | 10/2019 | Heath .................. H04L 43/045 |
| 2019/0364544 | A1* | 11/2019 | Parkvall ............... H04L 5/0051 |

FOREIGN PATENT DOCUMENTS

| | | |
|---|---|---|
| WO | 2014149062 A1 | 9/2014 |
| WO | 2017131806 A1 | 8/2017 |
| WO | 2017176438 A1 | 10/2017 |
| WO | 2017184058 A1 | 10/2017 |
| WO | 2017184865 A1 | 10/2017 |

OTHER PUBLICATIONS

Hou, et al. "DMRS design and channel estimation for L TE-advanced MIMO uplink." Vehicular Technology Conference Fall (VTC 2009—Fall), 2009 IEEE 7oth, 2009, 5 pages.

Hou, Xiaolin, and Hidetoshi Kayama. "Demodulation reference signal design and channel estimation for LTE-Advanced uplink." Advances in Vehicular Networking Technologies, In Tech, 2011, 18 pages.

Kasem, Edward, and Jan Prokopec. "The evolution of L Te to LTE-Advanced and the corresponding changes in the uplink reference signals." Elektrorecvue, ISSN (2012), 8 pages.

Noh, et al. "DMRS Design and Evaluation for 3GPP 5G New Radio in a High Speed Train Scenario" GLOBECOM 2017—2017 IEEE Global Communications Conference, IEEE, 2017,6 pages.

Koivisto, et al. "Reference signal design for flexible MIMO operation in LTE advanced downlink." Vehicular Technology Conference {VTC 2010—Spring), 2010, IEEE 71st, IEEE, 2010, 5 pages.

Non-Final Office Action received for U.S. Appl. No. 15/867,631 dated Apr. 2, 2019, 38 pages.

3GPP, "3rd Generation Partnership Project; Technical Specification Group Radio Access Network; NR; Physical layer Procedures for control (Release 15)," 3GPP TS 38.213 V1.3.0 (Dec. 2017), 58 pages.

Notice of Allowance received for U.S. Appl. No. 15/867,631 dated Jul. 29, 2019, 25 pages.

International Search Report and Written Opinion received for PCT Application Serial No. PCT/US2018/063118 dated Jul. 12, 2019, 31 pages.

NTT Docomo, Inc., "Discussion on remaining details on NR-PBCH and PBCH-DMRS", URL: http://www.3gpp.org/ftp/Meetings_3GPP_SYNC/RAN1/Docs, 3GPP TSG RAN WG1 Meeting NR#3, R1-1716070, Sep. 18-21, 2017, 14 pages.

LG Electronics, "Discussion on search space design", URL: http://www.3gpp.org/ftp/Meetings 3GPP_SYNC/RAN1/Docs/, 3GPP TSG RAN WG1 Meeting 90bis, R1-1717952, Oct. 9-13, 2017, pp. 1-11.

AT&T, "Remaining details for DMRS design", URL: http://www.3gpp.org/ftp/tsg%5Fran/WG1%5FRL1/TSGR1%5F91/Docs/, 3GPP TSG RAN WG1 Meeting 91, R1-1719637, Nov. 27-Dec. 1, 2017, 5 pages.

Spreadtrum Communications, "Remaining issues on DMRS", URL: http://www.3gpp.org/ftp/tsg%5Fran/WG1%5FRL1/TSGR1%5F91/Docs, 3GPP TSG RAN WG1 Meeting 91, R1-1719692, Nov. 27-Dec. 1, 2017, 7 pages.

AT&T, "On DCI contents and formats", URL: http://www.3gpp.org/ftp/tsg%5FranjWG1%5FRL1/TSGR1%5F91/Docs, 3GPP TSG RAN WG1 Meeting 91, R1-1719643, Nov. 27-Dec. 1, 2017, 9 pages.

ZTE, "Discussion on downlink DMRS design", URL: http://www.3gpp.org/ftp/tsg_ran/WG1_RL1/TSGR1 89/Docs, 3GPP TSG RAN WG1 Meeting #89, R1-1707130, May 15-19, 2017, 11 pages.

Interdigital Communications, "On NR-PBCH Transmission", URL: http://www.3gpp.org/ftp/tsg_ran/WG1_RL1/TSGR1 88b/Docs/, 3GPP TSG RAN WG1 Meeting #88bis, R1-1705500, Apr. 3-7, 2017, 8 pages.

"NR-PBCH design", URL: http://www.3gpp.org/ftp/Meetings_3GPP_SYNC/RAN1/Docs, 3GPP TSG RAN WG1 #88bis, R1-1705321, Apr. 3-7, 2017, 8 pages.

\* cited by examiner

CONFIGURATION OF DEMODULATION REFERENCE SIGNALS IN BEAMFORMED WIRELESS COMMUNICATION SYSTEMS

RELATED APPLICATION

The subject patent application is a continuation of, and claims priority to, U.S. patent application Ser. No. 15/867,631, filed Jan. 10, 2018, and entitled "CONFIGURATION OF DEMODULATION REFERENCE SIGNALS IN BEAMFORMED WIRELESS COMMUNICATION SYSTEMS," the entirety of which application is hereby incorporated by reference herein.

TECHNICAL FIELD

The present application relates generally to the field of mobile communication and, more specifically, to signaling a location of demodulation reference signals in a beamformed wireless communications transmission in a next generation wireless communications network.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G and other next generation network standards.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
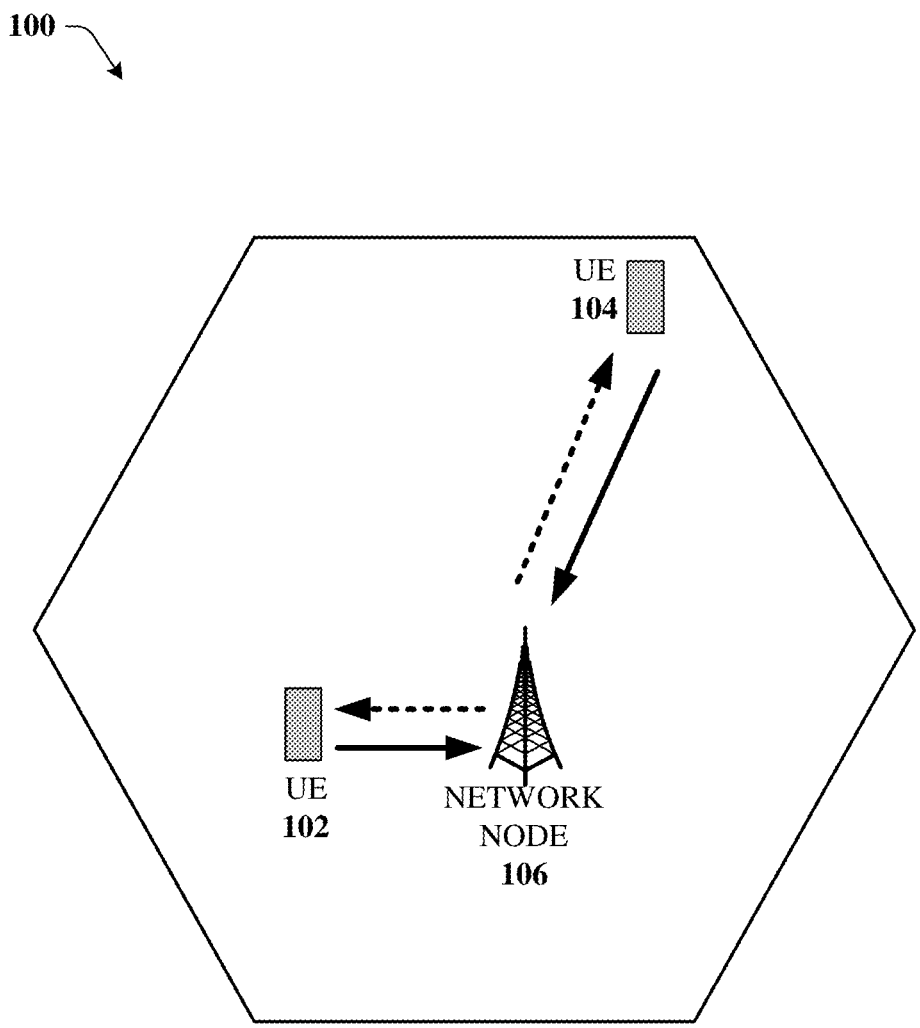
FIG. 1 illustrates an example wireless communication system in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

Various embodiments disclosed herein provide for efficient configuration of demodulation reference signals in beamformed wireless communications systems. To compensate for mutual coupling losses in millimeter wave systems, wireless communications systems in these frequency ranges are beamformed whereby either digitally or in the radio frequency domain the transmitted and/or received energy is bundled in space, viz., spatially directed towards a receiver/transmitter. Beam sweeping encompasses transmission of identical or mostly identical signals/payloads in different directions which together cover the entire coverage area of a transmitter. Beam sweeping is a costly procedure that incurs significant overhead—since identical or almost identical information is transmitted in different directions. Thus, in order to limit the overhead from such beam swept transmissions, it is highly desirable to (a) align the transmission duration of physical downlink shared channels (PDSCHs) that deliver remaining system information (RMSI) with that of synchronization blocks (SS blocks) comprising synchronization signals and (b) to transmit the RMSI on the same beam as the SS blocks. SS blocks simply incorporate primary synchronization signals (PSS), secondary synchronization signals (SSS) and physical broadcast channels (PBCH) for a given spatial direction/beam.

In various embodiments, the transmitter can signal the location of demodulation reference signals by including an indicator bit in downlink control information indicating which DMRS scheme is used in the transmission. A first DMRS scheme can let the user equipment (UE) device know that the DMRS position for the PDSCH carrying the RMSI is as signaled on the master information block (MIB)—referred to as PDSCH Mapping Type A. A second DMRS scheme can let the UE device know that the DMRS position for the PDSCH carrying the RMSI is the first orthogonal frequency division multiplexing (OFDM) symbol of said PDSCH allocation (referred to as PDSCH mapping type B). In another embodiment, the DMRS position can be communicated in the downlink control information by indicating which resource allocation the DMRS signal is in. In yet another embodiment, the MIB payload can indicate where the DMRS position is for the PDSCH carrying the RMSI. In yet another embodiment, the DMRS position can be communicated based on one or more tables associated with the specification. The downlink control information can specify which table indicates the position of the DMRS.

In various embodiments, a base station device can comprise a processor and a memory that stores executable instructions that, when executed by the processor facilitate performance of operations. The operations can comprise signaling a location for a demodulation reference signal in a data transport data channel, wherein the location identifies a symbol of the data transport data channel in which the demodulation reference signal is located, and wherein the data transport data channel transports data comprising remaining system information, wherein the remaining system information is system information that is not transmitted via a control channel. The operations can also comprise multiplexing the data transport data channel with a synchronization block that comprises a synchronization signal and a physical broadcast channel for a spatial direction. The operations can also comprise transmitting a beam comprising the data transport data channel and the synchronization block in the spatial direction, wherein the beam comprises a beam-formed transmission.

In another embodiment, method comprises identifying, by a transmitter device comprising a processor, a location for a demodulation reference signal in a data transport data channel, wherein the location identifies a symbol of the data transport data channel in which the demodulation reference signal is located, and wherein the data transport data channel is used to transmit data comprising system information. The method can also comprise combining, by the transmitter device, the data transport data channel with a synchronization signal block that comprises a synchronization signal and a physical broadcast channel, wherein the combining is performed via orthogonal frequency division multiplexing. The method can also comprise transmitting, by the transmitter device, a beam comprising the data transport data channel and the synchronization signal block, wherein the beam comprises a beam-formed transmission.

In another embodiment machine-readable storage medium, comprising executable instructions that, when executed by a processor of a device, facilitate performance of operations. The operations can comprise identifying a location for a demodulation reference signal in a physical downlink shared channel, wherein the location identifies a symbol of the physical downlink shared channel in which the demodulation reference signal is located, and wherein the physical downlink shared channel facilitates transmission of data comprising remaining system information. The operations can also comprise combining the physical downlink shared channel with a synchronization signal block that comprises a synchronization signal and a physical broadcast channel, wherein the combining is performed via orthogonal frequency division multiplexing. The operations can also comprise transmitting a beam comprising the physical downlink shared channel and the synchronization signal block, wherein the beam comprises a beam-formed transmission.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

FIG. 1 illustrates an example wireless communication system 100 in accordance with various aspects and embodiments of the subject disclosure. In one or more embodiments, system 100 can comprise one or more user equipment UEs 104 and 102, which can have one or more antenna panels having vertical and horizontal elements. A UE 102 can be a mobile device such as a cellular phone, a smartphone, a tablet computer, a wearable device, a virtual reality (VR) device, a heads-up display (HUD) device, a smart car, a machine-type communication (MTC) device, and the like. UE 102 can also refer to any type of wireless device that communicates with a radio network node in a cellular or mobile communication system. Examples of UE 102 are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. User equipment UE 102 can also comprise IOT devices that communicate wirelessly. In various embodiments, system 100 is or comprises a wireless communication network serviced by one or more wireless communication network providers. In example embodiments, a UE 102 can be communicatively coupled to the wireless communication network via a network node 106.

The non-limiting term network node (or radio network node) is used herein to refer to any type of network node serving a UE 102 and UE 104 and/or connected to other network node, network element, or another network node from which the UE 102 or 104 can receive a radio signal. Network nodes can also have multiple antennas for performing various transmission operations (e.g., MIMO operations). A network node can have a cabinet and other protected enclosures, an antenna mast, and actual antennas. Network nodes can serve several cells, also called sectors, depending on the configuration and type of antenna. Examples of network nodes (e.g., network node 106) can comprise but are not limited to: NodeB devices, base station (BS) devices, access point (AP) devices, and radio access network (RAN) devices. The network node 106 can also comprise multi-standard radio (MSR) radio node devices, including but not limited to: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like. In 5G terminology, the node 106 can be referred to as a gNodeB device.

Wireless communication system 100 can employ various cellular technologies and modulation schemes to facilitate wireless radio communications between devices (e.g., the UE 102 and 104 and the network node 106). For example, system 100 can operate in accordance with a UMTS, long term evolution (LTE), high speed packet access (HSPA), code division multiple access (CDMA), time division multiple access (TDMA), frequency division multiple access (FDMA), multi-carrier code division multiple access (MC-CDMA), single-carrier code division multiple access (SC-CDMA), single-carrier FDMA (SC-FDMA), OFDM, (DFT)-spread OFDM or SC-FDMA)), FBMC, ZT DFT-s-OFDM, GFDM, UFMC, UW DFT-Spread-OFDM, UW-OFDM, CP-OFDM, resource-block-filtered OFDM, and UFMC. However, various features and functionalities of system 100 are particularly described wherein the devices (e.g., the UEs 102 and 104 and the network device 106) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs).

In an embodiment, network node 106 can send beamformed transmissions to UE 104 and 102 in order to avoid mutual coupling losses. Particularly, in the centimeter wave (cmWave) regime, but even more so in the millimeter wave (mmWave) regime, the mutual coupling loss (MCL)

between the transmitter and receiver is exorbitantly larger than in traditional wireless communications systems which predominantly operate in frequency ranges below 6 GHz or even below 1 GHz. The near-field loss—which quadratically depends on the carrier frequency—is responsible for the lower MCL in free-space propagation and whereas path loss exponents do not significantly depend on the carrier frequency, the penetration loss does exceedingly depend on the carrier frequency as well. On top, the bandwidths that are available in mmWave systems are also vastly larger than below 6 GHz, thereby further decreasing the MCL by means of a higher thermal noise floor.

To compensate the extreme MCL in mmWave systems, wireless communications systems in these frequency ranges are beamformed whereby either digitally or in the radio frequency domain the transmitted and/or received energy is bundled in space, viz., spatially directed towards a receiver/transmitter. Referring to FIG. 1, the network node 106 beamforms the primary and secondary synchronization signals (PSS and SSS, respectively) as well as the physical broadcast channel (PBCH). The PBCH carries the MasterinformationBlock (MIB) whereas remaining system information (RMSI) is delivered via physical downlink shared channel (PDSCH) transmissions each scheduled by a physical downlink control channel (PDCCH) transmission. After receiving the RMSI, which contains the random access channel (RACH) configuration, user equipment (UE) can initiate a random access procedure by sending a physical random access channel (PRACH) transmission which the network responds to in the random access response (RAR) scheduled by a PDCCH in. The RAR contains amongst others an uplink (UL) grant for the message 3 transmitted on the physical uplink shared channel (PUSCH).

Figure 3:
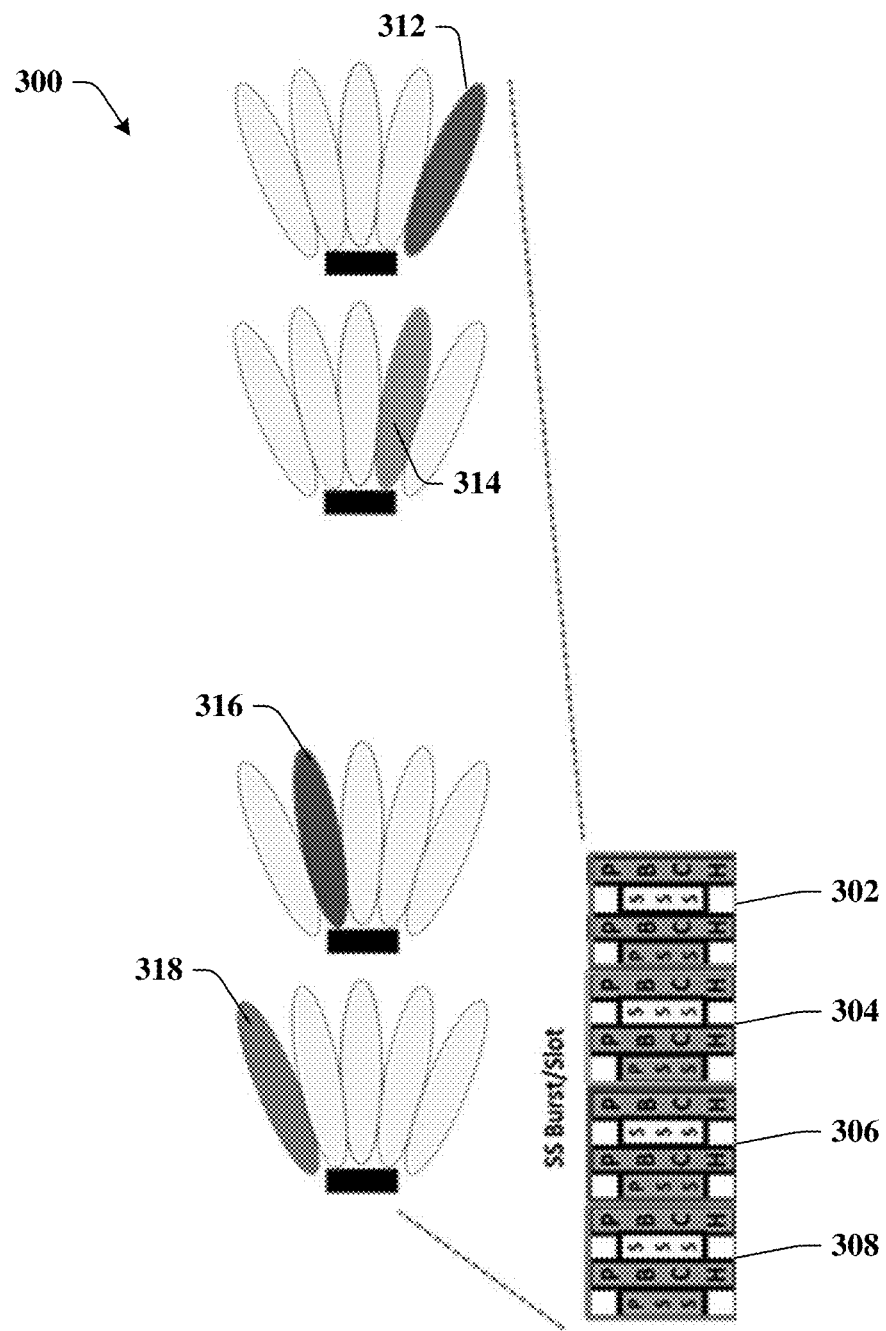
FIG. 3 illustrates an example block diagram embodiment of a transmitter performing beamsweeping in accordance with various aspects and embodiments of the subject disclosure.

In order to beamform the transmissions the broadcasted signals and channels are "beam swept." Beam sweeping is illustrated in diagram 300 depicted in FIG. 3 and encompasses transmission of identical or mostly identical signals/payloads in different directions which together cover the entire coverage area of a transmitter/transmission point/base station/next-generation Node B (gnodeB/gNB). As an example, payload 302 is transmitted in a first direction at a first time, while payloads 304, 306, and 308 are transmitted sequentially in the other directions at respective times.

Figure 4:
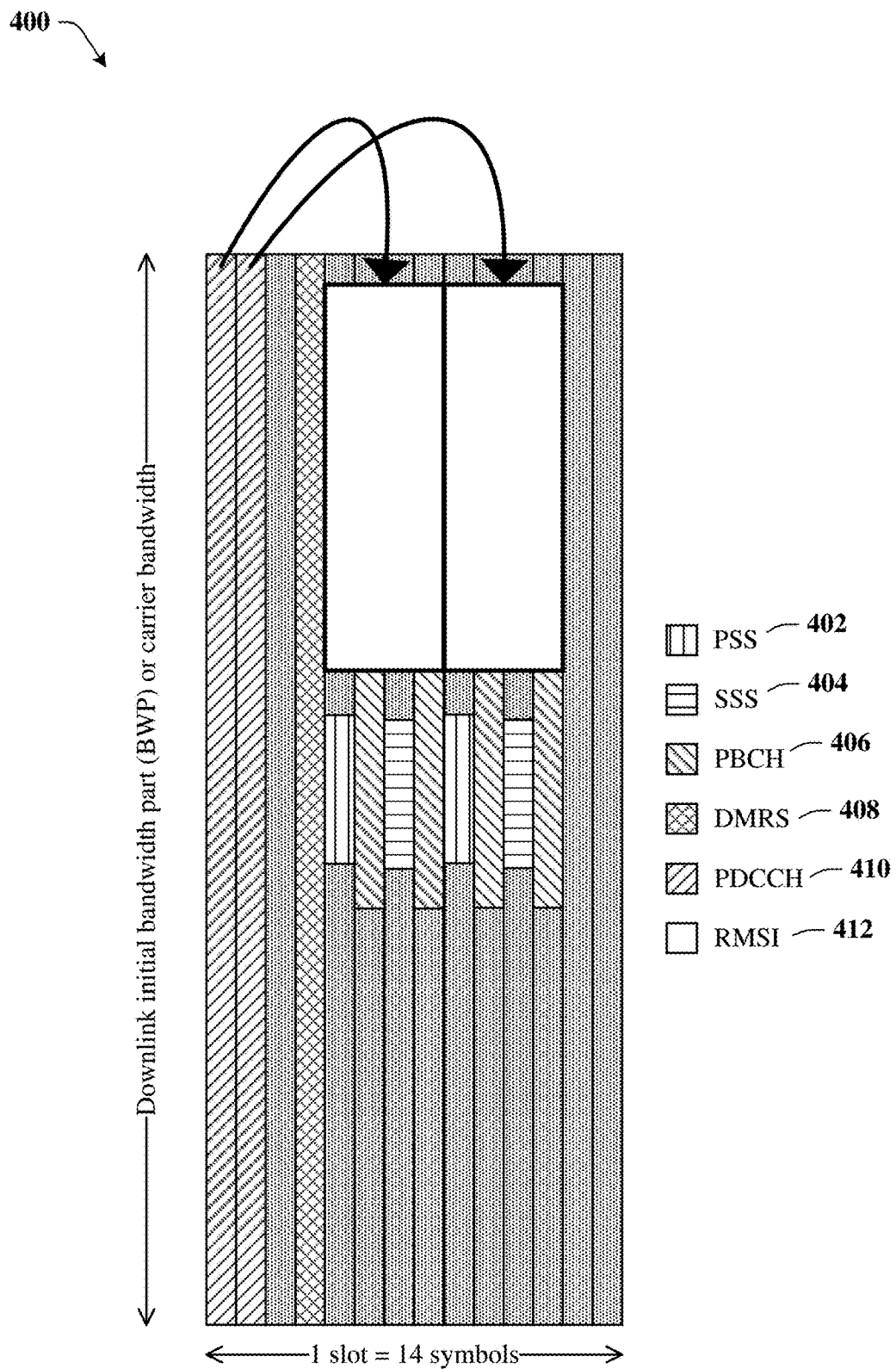
FIG. 4 illustrates an example block diagram configuration of a slot with SS blocks and one subcarrier spacing in accordance with various aspects and embodiments of the subject disclosure.

Assuming an orthogonal frequency division multiplexing (OFDM) system and taking 3GPP NR as an example, the OFDM subcarrier spacing for SS blocks could be one of {15,30,120,240} kHz whereas the OFDM subcarrier spacing of PDCCHs/PDSCHs delivering RMSI could be one of {15,30,60,120} kHz. Due to the (power-of-two) scaling laws of these subcarrier spacings and because SS blocks always comprise four OFDM symbols (compare FIGS. 3 and 4) and for the applicable combinations per the 3GPP 5G NR standard, PDSCH transmissions that deliver RMSI and that are aligned with SS block transmission durations can span either 2 or 4 OFDM symbols as depicted in FIGS. 3 and 4. Hence, within a given slot of 14 OFDM symbols up to 4×L transmissions carrying RMSI can theoretically be scheduled assuming they are frequency-division multiplexed (FDM'ed) with SS blocks and the transmitter hardware is capable of producing L beams at any given time.

To transmit 4×L transmissions carrying RMSI within a slot, 4×L PDCCH transmissions are required. Ideally, these PDCCHs are transmitted on the same beam as the corresponding RMSI which itself is transmitted on the same beam as one of the SS blocks. In order to transmit 4×L PDCCH transmissions scheduling 4×L transmissions carrying RMSI, 4 OFDM symbols with control resources are needed. The 5G NR system, however, supports a maximum control resource set (CORESET) span of 3. In particular, the maximum CORESET span is 2 OFDM symbols when DMRS for slot-based transmissions is sent on the $3^{rd}$ OFDM symbol of a slot and the maximum CORESET span is 3 OFDM symbols when DMRS for slot-based transmissions is sent on the $4^{th}$ OFDM symbol of a slot. Whether DMRS for slot-based transmissions occurs on the third or fourth symbol is broadcasted in either the MIB or RMSI.

According to embodiment of the subject disclosure, methods and apparatus are disclosed that fix the DMRS position for slot-based transmissions in slots carrying SS blocks while retaining the flexibility of being able to configure its position by broadcast signaling. In other words, unlike the prior art, the DMRS position for slot based transmissions can differ between slots.

According to an embodiment, for a gNB (e.g., network node 106) with L=4 antenna panels, i.e., the capability to send L=4 beams simultaneously, and assuming 240 kHz subcarrier spacing for SS blocks, we can use 3 OFDM symbols to schedule 12 mini-slots carrying RMSI in the same beams as the 4×L=16 SS block transmissions within the duration of a slot. Then, $^{12}/_{16}$=75% of SS block beams are used for RMSI transmissions. This, however, requires to fix the DMRS position in the MIB to the 4th OFDM symbol to make available 3 OFDM symbols for transmission of control information required to schedule the RMSI. If, on the other hand, the DMRS position in the MIB is set to the 3rd OFDM symbol, only 8 mini-slots can be scheduled (2 symbols carrying control information each with L=4 beams) in the same beams as the 16 SS block transmissions and the re-use drops by 33% to $^{8}/_{16}$=50%.

In order to retain the flexibility of signaling the DMRS position in the MIB while maximizing the reuse of SS block beams for RMSI transmissions in slots with SS block transmissions, in an embodiment, to fix the DMRS position in slots with SS blocks to the 4th OFDM symbol regardless of what DMRS position is signaled in the MIB for slot based PDSCH transmissions.

The proposed solutions addresses some of the shortcomings of previous implementation. The DMRS position for slot based transmissions can still be configured in a cell-specific manner, i.e., independently of a UE's UE-specific transmission bandwidth (e.g., UE 102 or 104). At the same time, the reuse of beams/antenna panels at the gNB can be increased by up to 33% when RMSI and SS block transmissions are frequency division multiplexed within the same analog RF beam. Specifically, a short CORESET span can be signaled in the MIB/RMSI, thereby allowing to tailor the control overhead to the small number of users within a narrow analog RF beam, while at the same time, a large CORESET span can be configured in slots carrying SS block transmissions in order to allow scheduling of as many RMSI transmissions as possible whereby said RMSI transmissions are aligned with the transmission durations of SS block transmissions such that they can be multiplexed within the same RF beam.

In an embodiment, the DMRS position is informed to the UE as part of the downlink control information (DCI) carried on the PDCCH that schedules the PDSCH carrying the RMSI. For example, a single bit in the DCI can inform the UE whether the DMRS position for the PDSCH carrying the RMSI is as signaled on the MIB (referred to as PDSCH mapping type A) or whether the DMRS position for the PDSCH carrying the RMSI is the first OFDM of said PDSCH allocation (referred to as PDSCH mapping type B).

In another embodiment, the DMRS position is also informed to the UE as part of the downlink control information (DCI) carried on the PDCCH that schedules the PDSCH carrying the RMSI. However, instead of using a dedicated bit in the DCI the PDSCH mapping type (viz. A or B) is jointly informed to the UE with the resource allocation for the PDSCH carrying the RSMI. For example, a table could be defined in the specifications of the wireless communications systems whereby N bits in the DCI point to 2N rows of said table and each row encodes the resource allocation of the PDSCH together with the PDSCH mapping type (A or B).

In yet another embodiment, the DMRS position is not informed to the UE as part of the downlink control information (DCI) carried on the PDCCH that schedules the PDSCH carrying the RMSI. Rather, the MIB payload informs the UE about the DMRS position for the PDSCH carrying the RMSI.

In yet another embodiment, the DMRS position is informed to the UE as part of one or more of the tables. In one example, the PDSCH mapping type (A or B) of the PDSCH carrying the RMSI is explicitly included in said tables. Alternatively, the PDSCH mapping type (A or B) of the PDSCH carrying the RMSI can be implicitly derived from the "first symbol index" column of a table. In yet another example, the DMRS position for the PDSCH carrying the RMSI (PDSCH mapping type A or B) can be derived by a combination of one or more tables. For example, the "Number of Symbols $N_{symb}^{CORESET}$" column could be used to determine the PDSCH mapping type of the PDSCH carrying the RMSI. An exemplary table is included here in Table 1. In Table 1, Parameters for PDCCH monitoring occasions for Type0-PDCCH common search space—SS/PBCH block and control resource set multiplexing type 1 and carrier frequencies smaller than or equal to 6 GHz. Other tables included in the 3GPP specification can correspond to different transmission contexts.

TABLE 1

| Index | SS/PBCH block and control resource set multiplexing pattern | Number of RBs | Number of Symbols | Offset (RBs) |
|---|---|---|---|---|
| 0 | 1 | 48 | 1 | 0 |
| 1 | 1 | 48 | 1 | 8 |
| 2 | 1 | 48 | 2 | 0 |
| 3 | 1 | 48 | 2 | 8 |
| 4 | 2 | 24 | 1 | −41 if condition A −42 if condition B |
| 5 | 2 | 24 | 1 | 25 |
| 6 | 2 | 24 | 2 | −41 if condition A −42 if condition B |
| 7 | 2 | 24 | 2 | 25 |
| 8 | 2 | 48 | 1 | −41 if condition A −42 if condition B |
| 9 | 2 | 48 | 1 | 49 |
| 10 | 2 | 48 | 2 | −41 if condition A −42 if condition B |
| 11 | 2 | 48 | 2 | 49 |
| 12 | | Reserved | | |
| 13 | | Reserved | | |
| 14 | | Reserved | | |
| 15 | | Reserved | | |

The embodiments herein may equally be applied to transmission of other system information (OSI) as well as other common (i.e. broadcasted) channels incl. paging messages and random access responses in the random access channel (RACH) procedure. Some of the embodiments herein, pertinent information may not be transmitted by the MIB on the PBCH but rather by system information such as the RMSI. For example, for OSI, paging and RACH procedures, applicable configurations may be conveyed to the UE by RMSI rather than by the MIB.

In an embodiment, the DMRS position for slot based transmission is signaled in the MIB. Alternatively, it can also be signaled in the RMSI. However, in slots carrying SS blocks, the DMRS position for slot based transmission may differ from that signaled in the MIB/RMSI depending on the carrier frequency range. For example, in frequency bands with L≤16, the DMRS position for slot based transmissions may always be as signaled in the MIB/RMSI regardless of the presence of SS block transmissions within the same slot. However, for L>16, the DMRS position for slot based transmissions may be fixed to the $4^{th}$ OFDM symbol in slots with SS block transmissions regardless of what is signaled in the MIB/RMSI. Alternatively, instead of tying it to L, the behavior can depend on the carrier frequency directly, e.g., for carrier frequencies below $f_c$=2 GHz, the DMRS position for slot based transmissions may always be as signaled in the MIB/RMSI regardless of the presence of SS block transmissions within the same slot. However, for carrier frequencies beyond $f_c$=2 GHz, the DMRS position for slot based transmissions may be fixed to the $4^{th}$ OFDM symbol in slots with SS block transmissions regardless of what is signaled in the MIB/RMSI. The values of L and $f_c$ in these examples ought not to be construed in a limiting sense and other values can apply.

In another embodiment, the number of actually transmitted SS blocks can change depending on the deployment scenario, network configurability, or hardware capability, e.g., the gNB may only transmit L=16 instead of L=64. Depending on the number of actually transmitted SS blocks in a given slot, different DMRS symbol locations (e.g., 3rd or $4^{th}$ symbol) apply. In one alternative, the number and/or pattern of actually transmitted SS blocks is conveyed by the RMSI and the UE overrides the location of the MIB-indicated DMRS configuration based on the indication in the RMSI. For example, if the DMRS is configured to be present on the $4^{th}$ symbol per the MIB/RMSI, however, the RMSI indicates that only L≤16 SS blocks are transmitted, the UE may assume that DMRS is not transmitted on the $4^{th}$ symbol of those slots, but instead the 3rd symbol of the slot.

In yet another embodiment, the value of the DMRS location indicated in the MIB (e.g., $3^{rd}$ or $4^{th}$ OFDM symbol) could be different in each PBCH depending on the associated SS block time index. For example, in case of L=64, for SS block indices 0:15, the corresponding RMSI may only be transmitted in the same beams as the first 2 SS blocks and the MIB indicates the DMRS is located in the $3^{rd}$ symbol of the corresponding slot. However, for SS block indices 16:31, the corresponding RMSI may only be transmitted in the same beams as the remaining 2 SS blocks of the slot and the MIB indicates the DMRS is located $4^{th}$ symbol of the corresponding slot.

Figure 6:
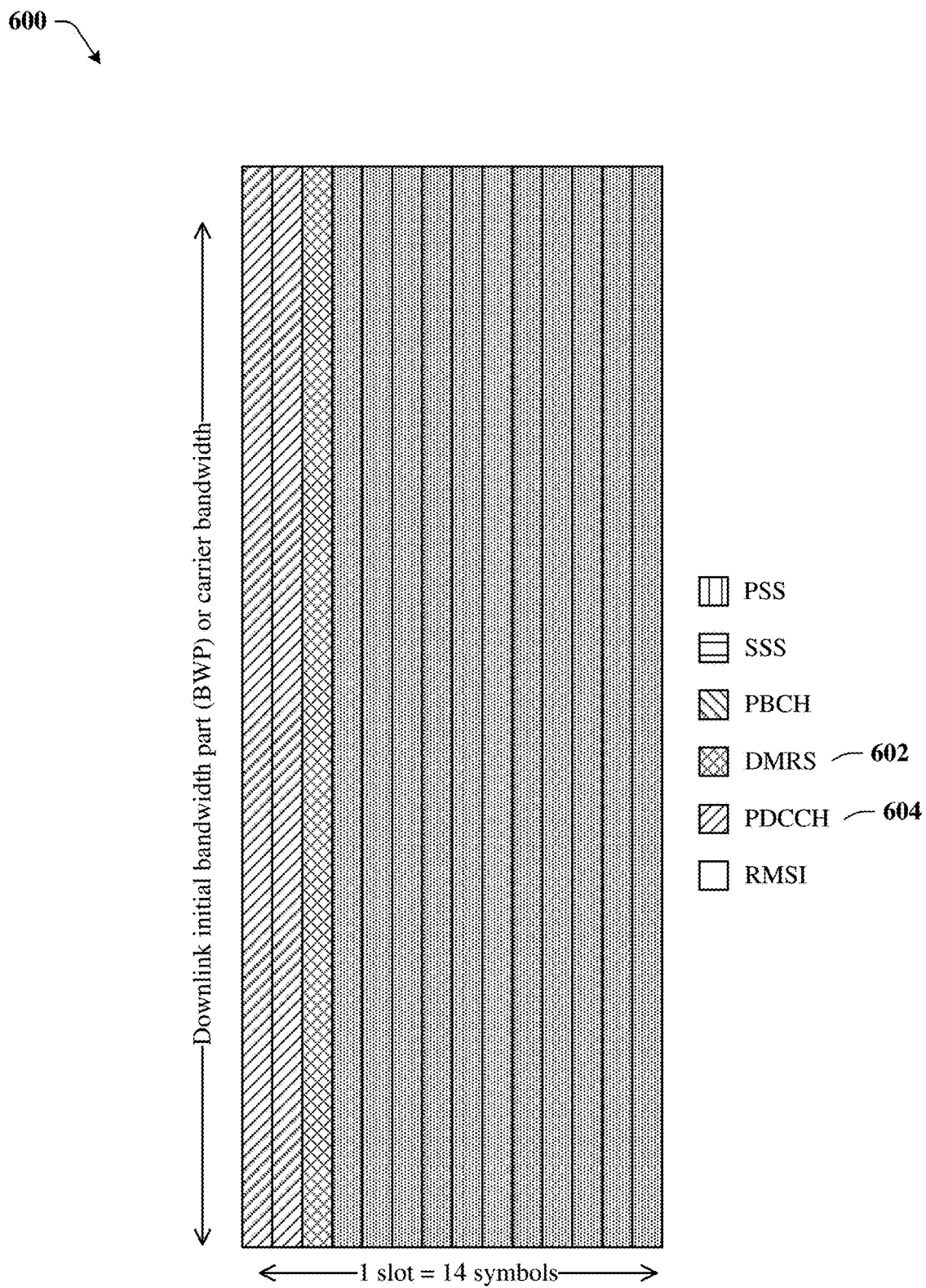
FIG. 6 illustrates an example block diagram configuration of a slot without SS blocks in accordance with various aspects and embodiments of the subject disclosure.

In yet another embodiment, the DMRS for slot based transmissions is not transmitted in slots in which SS blocks are transmitted. This allows the CORESET to span 4 OFDM symbols as depicted in FIG. 6 thereby allowing to schedule up to four PDSCH transmissions carrying RMSI which is also the maximum number of SS blocks in one slot for a given antenna panel. In other words, all beams of an antenna panel used for SS block transmissions can simultaneously be used for RMSI transmissions for utmost efficiency in the beam sweeping operation.

Other embodiments represent a combination of the embodiments herein. For example, whether DMRS for slot based transmissions is transmitted in slots carrying SS blocks could be band-specific, i.e., depending on the carrier frequency $f_c$. In another example, the number of SS block transmissions could differ between slots carrying SS block transmissions. Whether DMRS for slot based transmissions is transmitted in slots carrying SS blocks could then depend on the actual number of SS blocks in a given slot.

Figure 2:
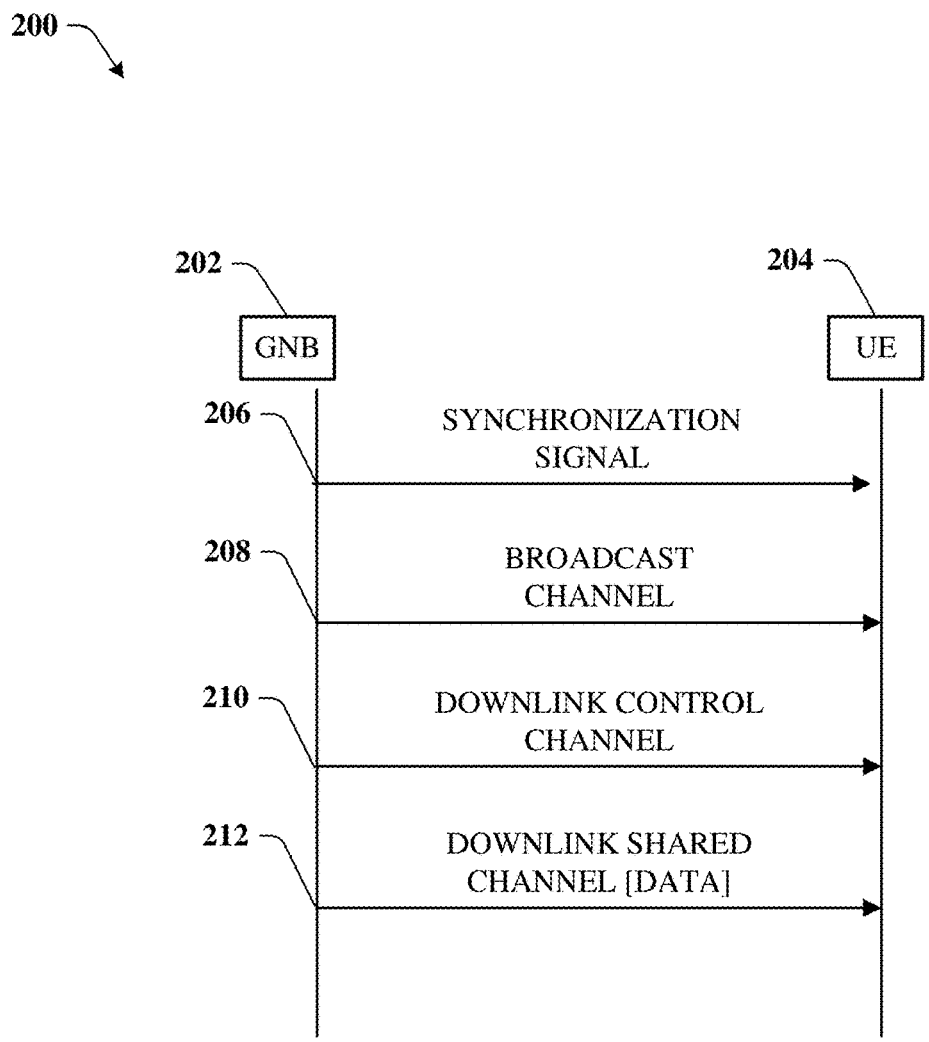
FIG. 2 illustrates an example block diagram showing a message sequence chart in accordance with various aspects and embodiments of the subject disclosure.

Turning now to FIG. 2, illustrated is an example block diagram showing a message sequence chart 200 in accordance with various aspects and embodiments of the subject disclosure.

In FIG. 2, a GNB 202 can transmit a beamformed communication to UE 204, and send a series of control channel information, signaling, and other control plane transmissions before sending the downlink shared channel 212 that comprises the data payload. The GNB 202 beamforms the primary and secondary synchronization signals 206 (PSS and SSS, respectively) as well as the physical broadcast channel (PBCH) 208. The PBCH carries the Master Information Block (MIB) whereas remaining system information (RMSI) is delivered via physical downlink shared channel (PDSCH) transmissions 212 each scheduled by a physical downlink control channel (PDCCH) transmission 210.

Turning now to FIG. 4, illustrated is an example block diagram 400 of a configuration of a slot with SS blocks and one subcarrier spacing in accordance with various aspects and embodiments of the subject disclosure. The embodiment shown in FIG. 4, can correspond to an embodiment where the DMRS 408 is in the $4^{th}$ symbol of the slot.

In an embodiment, the DMRS 408 position for slot based transmissions may be fixed to the $4^{th}$ OFDM symbol in slots with SS block transmissions regardless of what is signaled in the RMSI 412. Alternatively, instead of tying it to L, the behavior can depend on the carrier frequency directly, e.g., for carrier frequencies below $f_c$=2 GHz, the DMRS 408 position for slot based transmissions may always be as signaled in the RMSI 412 regardless of the presence of SS block transmissions (that include PSS 402, SSS 404, and PBCH 406) within the same slot. However, for carrier frequencies beyond $f_c$=2 GHz, the DMRS position for slot based transmissions may be fixed to the $4^{th}$ OFDM symbol in slots with SS block transmissions regardless of what is signaled in the MIB/RMSI. The slot can also include PDCCH 410 that can include downlink control information.

Figure 5:
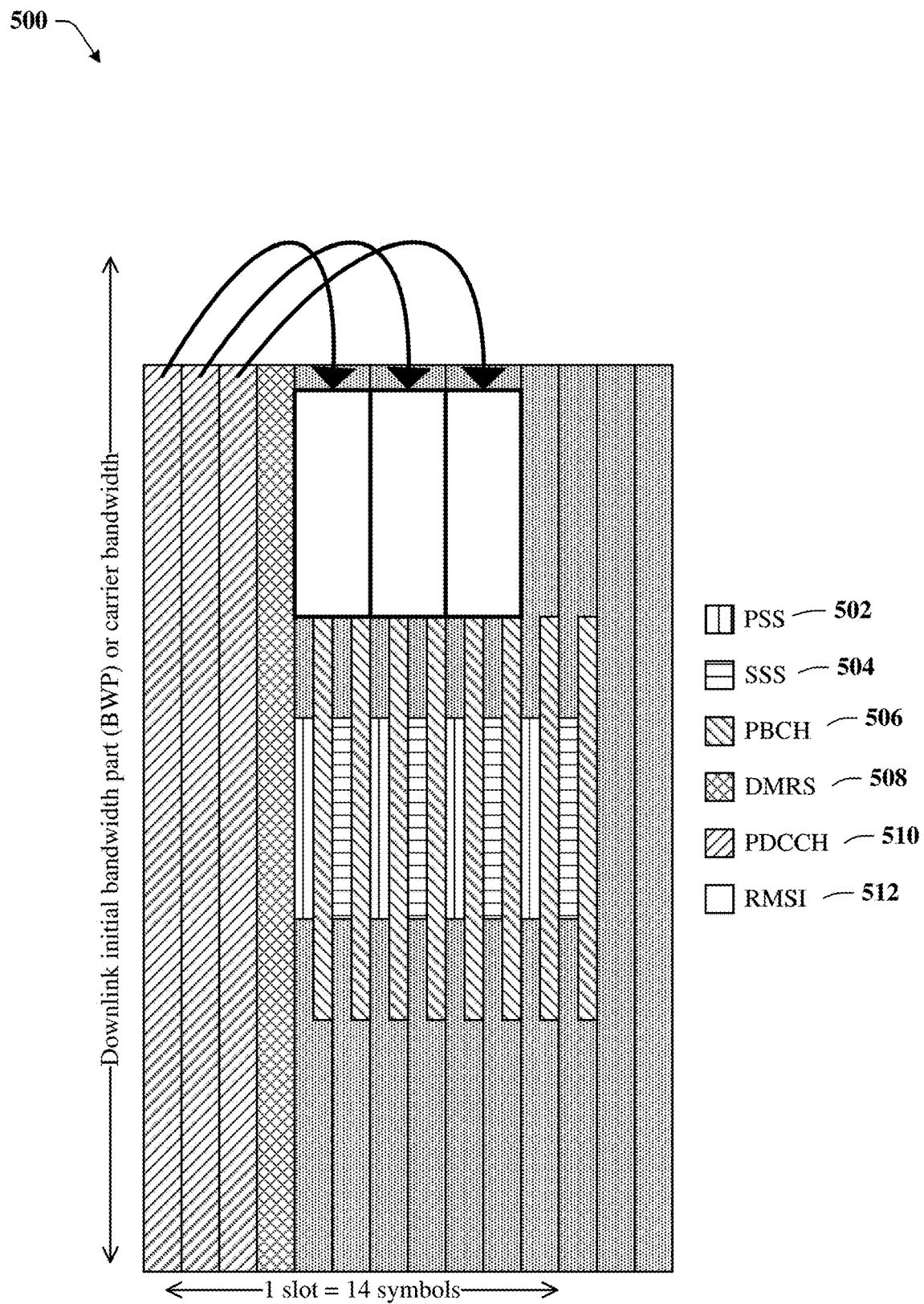
FIG. 5 illustrates an example block diagram configuration of a slot with SS blocks and two subcarrier spacing in accordance with various aspects and embodiments of the subject disclosure.

Turning now to FIG. 5, illustrated is an example block diagram 500 of a configuration of a slot with SS blocks and two subcarrier spacing in accordance with various aspects and embodiments of the subject disclosure. The embodiment shown in FIG. 5, can correspond to an embodiment where the DMRS 508 is in the $4^{th}$ symbol of the slot. Furthermore, in FIG. 5, since the beams have 2 subcarrier spacing, in the SS blocks, a symbol can comprise both a synchronization signal, either PSS 502 or SSS 504 along with the PBCH 506. The DMRS 508 can be located in the $4^{th}$ symbol and the slots can also include PDCCH 510 and RMSI 512. Since there are three beams of RMSI 512, there can be three sets of PDCCH 510 to configure the RMSI 512.

Turning now to FIG. 6, illustrated is an example block diagram 600 of a configuration of a slot without SS blocks in accordance with various aspects and embodiments of the subject disclosure. Since there are no SS blocks, the DMRS 602 can be on the third symbol along with two symbols of PDCCH 604.

Figure 7:
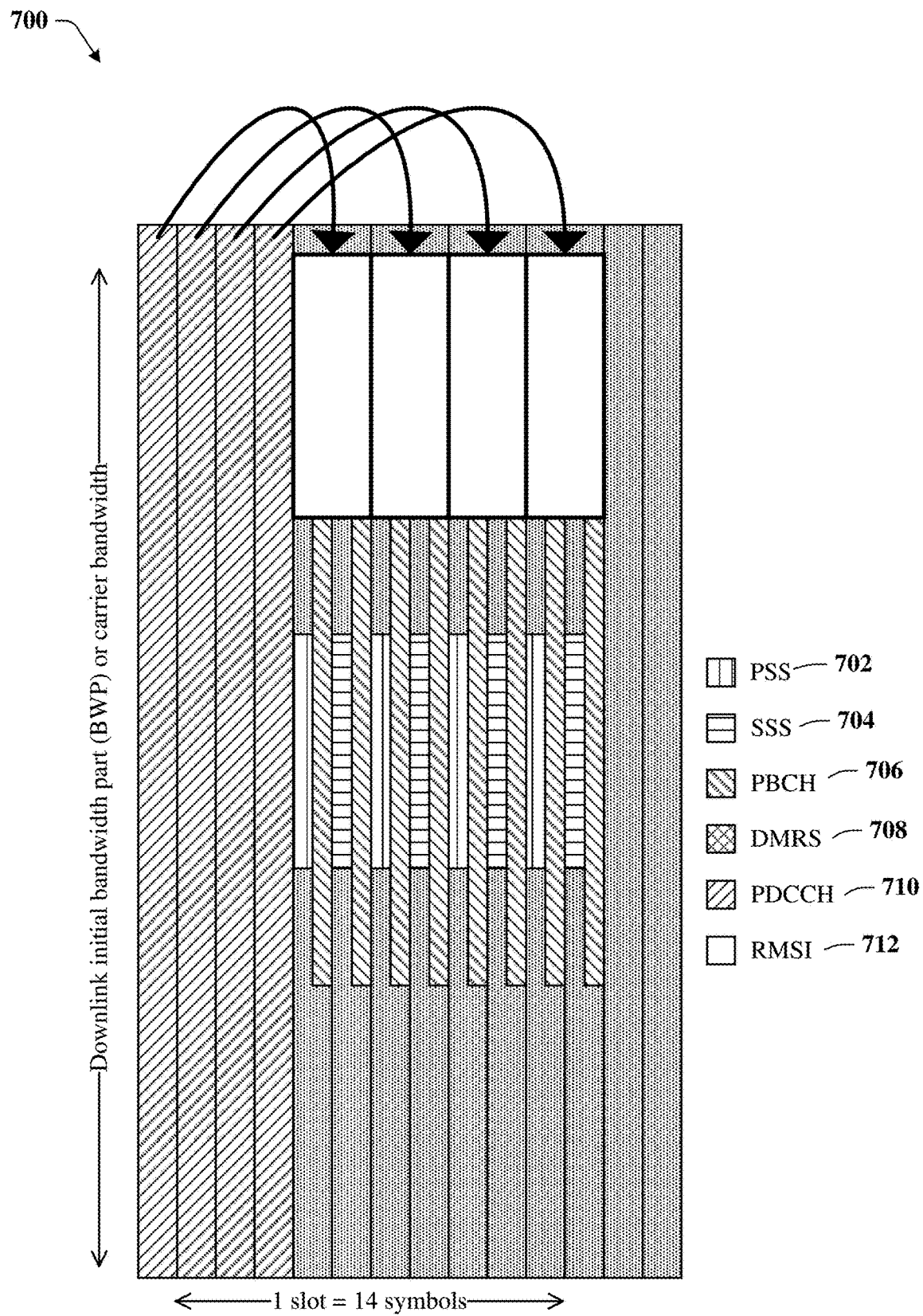
FIG. 7 illustrates another example block diagram configuration of a slot with SS blocks and two subcarrier spacing in accordance with various aspects and embodiments of the subject disclosure.

Turning now to FIG. 7, illustrated are another example block diagram 700 of a configuration of a slot with SS blocks and two subcarrier spacing in accordance with various aspects and embodiments of the subject disclosure The embodiment shown in FIG. 7, can correspond to an embodiment where the DMRS 708 is not present. In this embodiment, DMRS for slot based transmissions is not transmitted in slots in which SS blocks (e.g., PSS 702, SSS 704, and PBCH 706) are transmitted. This allows the CORESET to span 4 OFDM symbols (e.g., the four symbols of PDCCH 710) thereby allowing to schedule up to four PDSCH transmissions carrying RMSI 712 which is also the maximum number of SS blocks in one slot for a given antenna panel. In other words, all beams of an antenna panel used for SS block transmissions can simultaneously be used for RMSI transmissions for utmost efficiency in the beam sweeping operation.

Figure 8:
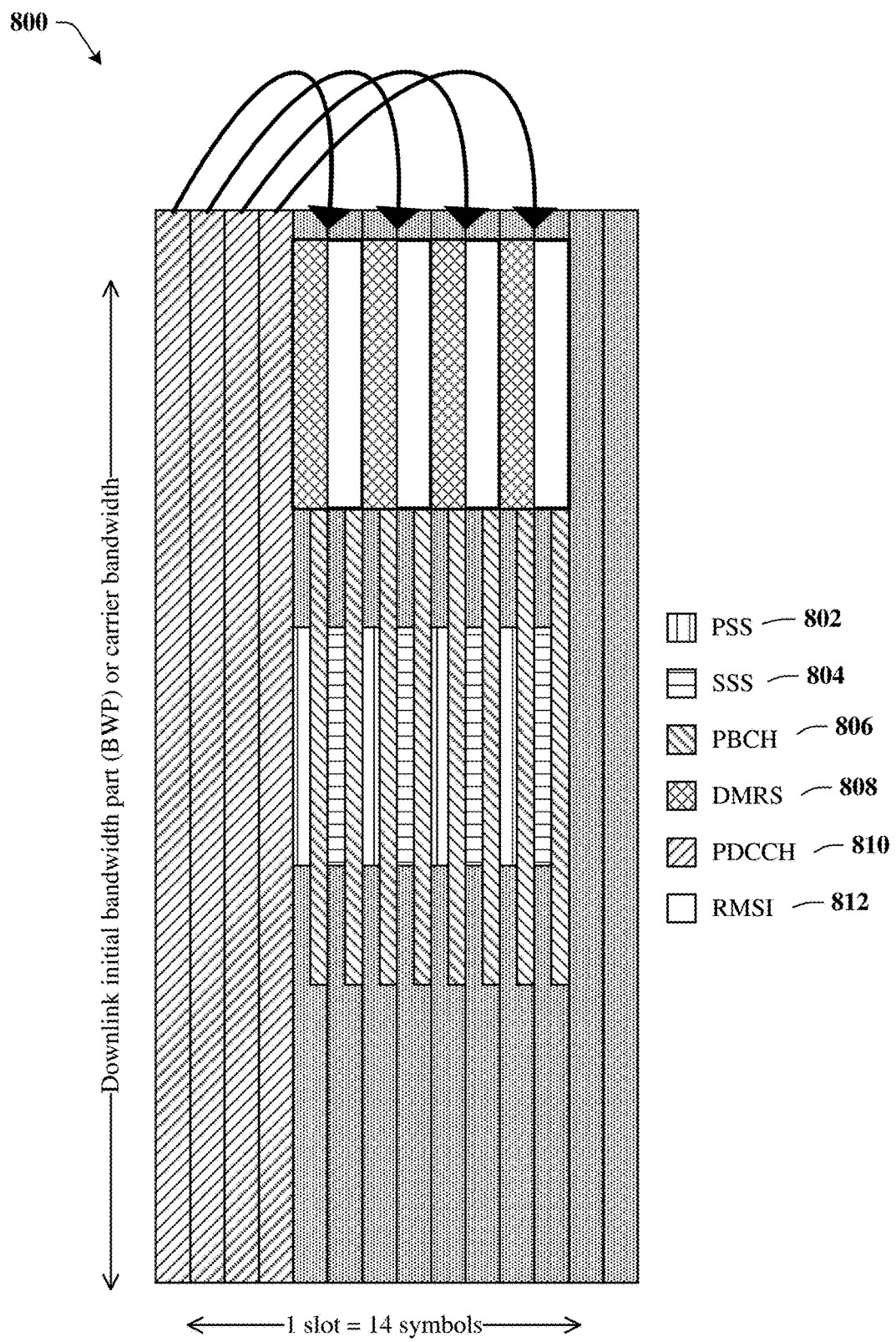
FIG. 8 illustrates another example block diagram configuration of a slot with SS blocks and two subcarrier spacing in accordance with various aspects and embodiments of the subject disclosure.

Turning now to FIG. 8 illustrated is another example block diagram 800 of a configuration of a slot with SS blocks and two subcarrier spacing in accordance with various aspects and embodiments of the subject disclosure. In the embodiment, the CORESET can span 4 OFDM symbols (e.g., the four symbols of PDCCH 810) thereby allowing to schedule up to four PDSCH transmissions carrying RMSI 812 which is also the maximum number of SS blocks (e.g., PSS 802, SSS 804, and PBCH 806) in one slot for a given antenna panel. In the embodiment shown, the DMRS 808 can be included in the RMSI 812.

In an embodiment, the DMRS 808 position is informed to the UE as part of the downlink control information (DCI) carried on the PDCCH 810 that schedules the PDSCH carrying the RMSI 812. For example, a single bit in the DCI can inform the UE whether the DMRS position for the PDSCH carrying the RMSI 812 is as signaled on the MIB (referred to as PDSCH mapping type A) or whether the DMRS 808 position for the PDSCH carrying the RMSI 812 is the first OFDM of said PDSCH allocation (referred to as PDSCH mapping type B).

In another embodiment of the present application, the DMRS 808 position is also informed to the UE as part of the downlink control information (DCI) carried on the PDCCH that schedules the PDSCH carrying the RMSI 812. However, instead of using a dedicated bit in the DCI the PDSCH mapping type (viz. A or B) is jointly informed to the UE with the resource allocation for the PDSCH carrying the RSMI 812. For example, a table could be defined in the specifications of the wireless communications systems whereby N bits in the DCI point to 2N rows of said table and each row encodes the resource allocation of the PDSCH together with the PDSCH mapping type (A or B).

Figure 9:
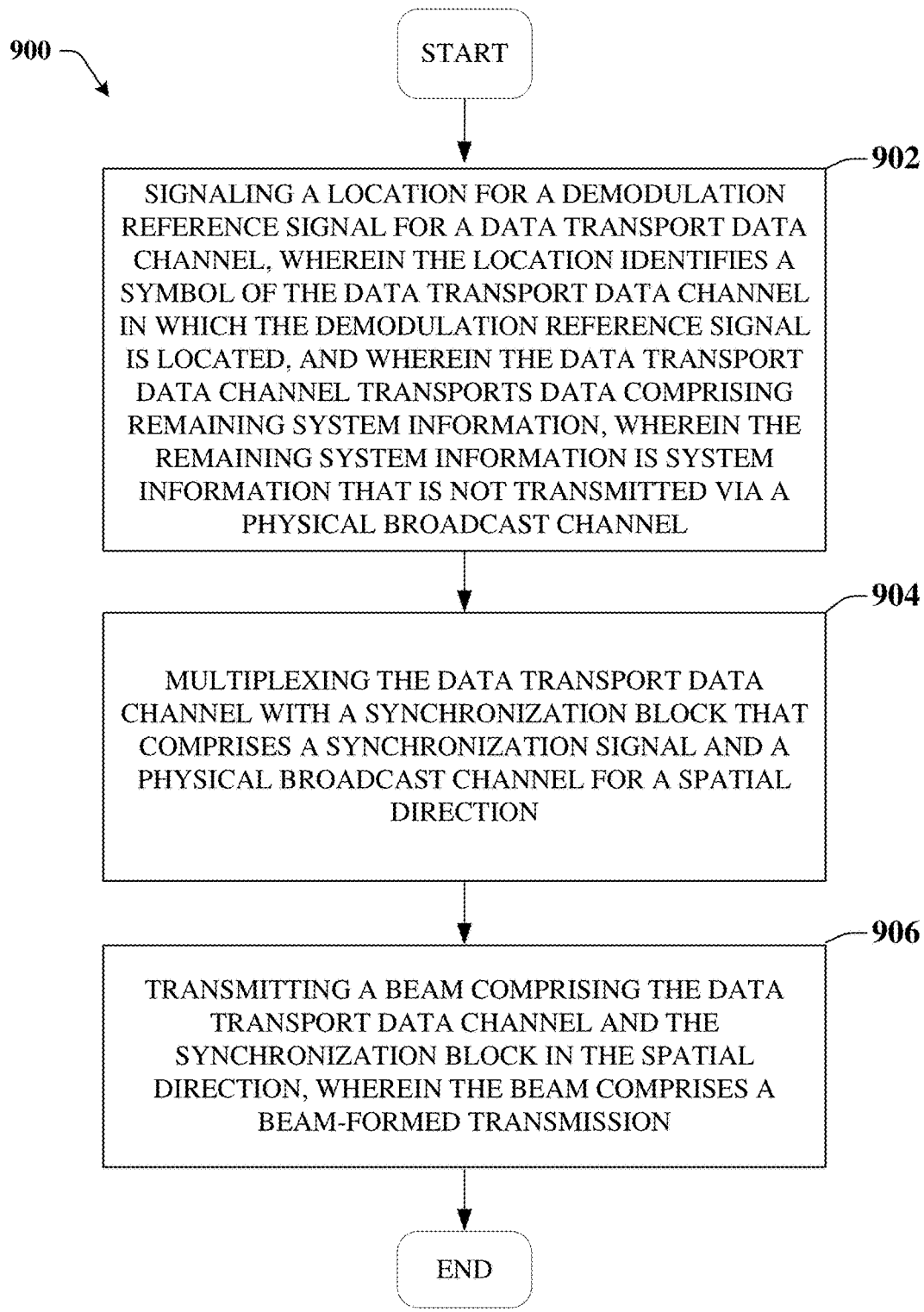
FIG. 9 illustrates an example method for recovering a beam during a partial control channel failure in accordance with various aspects and embodiments of the subject disclosure.
Figure 10:
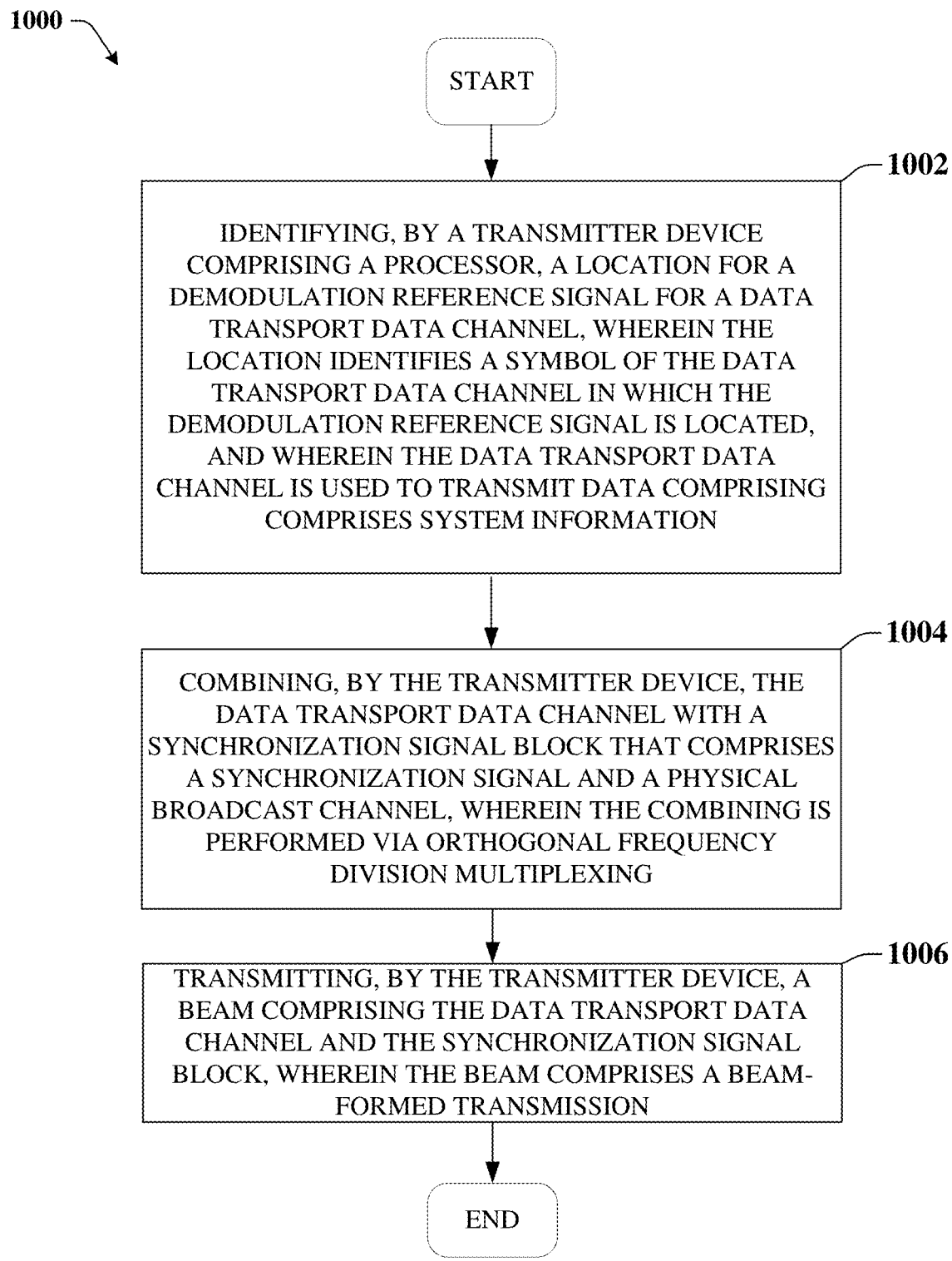
FIG. 10 illustrates an example method for recovering a beam during a partial control channel failure in accordance with various aspects and embodiments of the subject disclosure.

FIGS. 9-10 illustrates a process in connection with the aforementioned systems. The processes in FIGS. 9-10 can be implemented for example by the systems in FIGS. 1-8 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 9 illustrates an example method 900 for recovering a beam during a partial control channel failure in accordance with various aspects and embodiments of the subject disclosure.

Method 900 can begin at 902 where the method includes signaling a location for a demodulation reference signal in a data transport data channel, wherein the location identifies a symbol of the data transport data channel in which the demodulation reference signal is located, and wherein the data transport data channel transports data comprising remaining system information, wherein the remaining system information is system information that is not transmitted via a control channel.

At 904, the method includes multiplexing the data transport data channel with a synchronization block that comprises a synchronization signal and a physical broadcast channel for a spatial direction.

At 906, the method includes transmitting a beam comprising the data transport data channel and the synchronization block in the spatial direction, wherein the beam comprises a beam-formed transmission.

FIG. 10 illustrates an example method 1000 for recovering a beam during a partial control channel failure in accordance with various aspects and embodiments of the subject disclosure.

Method 1000 can begin at 1002 wherein the method includes identifying, by a transmitter device comprising a processor, a location for a demodulation reference signal in a data transport data channel, wherein the location identifies a symbol of the data transport data channel in which the demodulation reference signal is located, and wherein the data transport data channel is used to transmit data comprising system information.

At 1004, the method can include combining, by the transmitter device, the data transport data channel with a synchronization signal block that comprises a synchronization signal and a physical broadcast channel, wherein the combining is performed via orthogonal frequency division multiplexing.

At 1006, the method can include transmitting, by the transmitter device, a beam comprising the data transport data channel and the synchronization signal block, wherein the beam comprises a beam-formed transmission.

Figure 11:
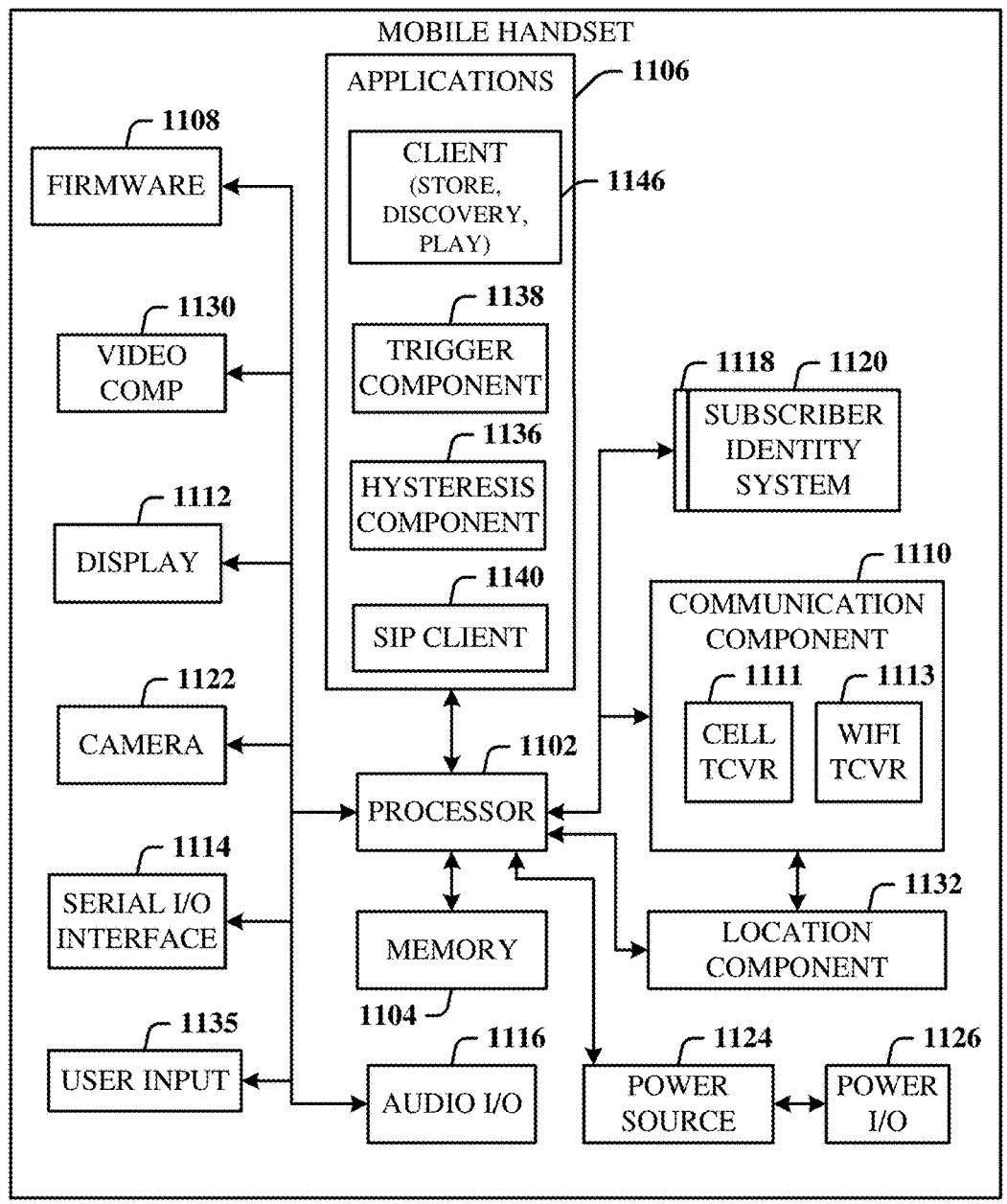
FIG. 11 illustrates an example block diagram of an example user equipment that can be a mobile handset operable to provide a format indicator in accordance with various aspects and embodiments of the subject disclosure.

Referring now to FIG. 11, illustrated is a schematic block diagram of an example end-user device such as a user equipment) that can be a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
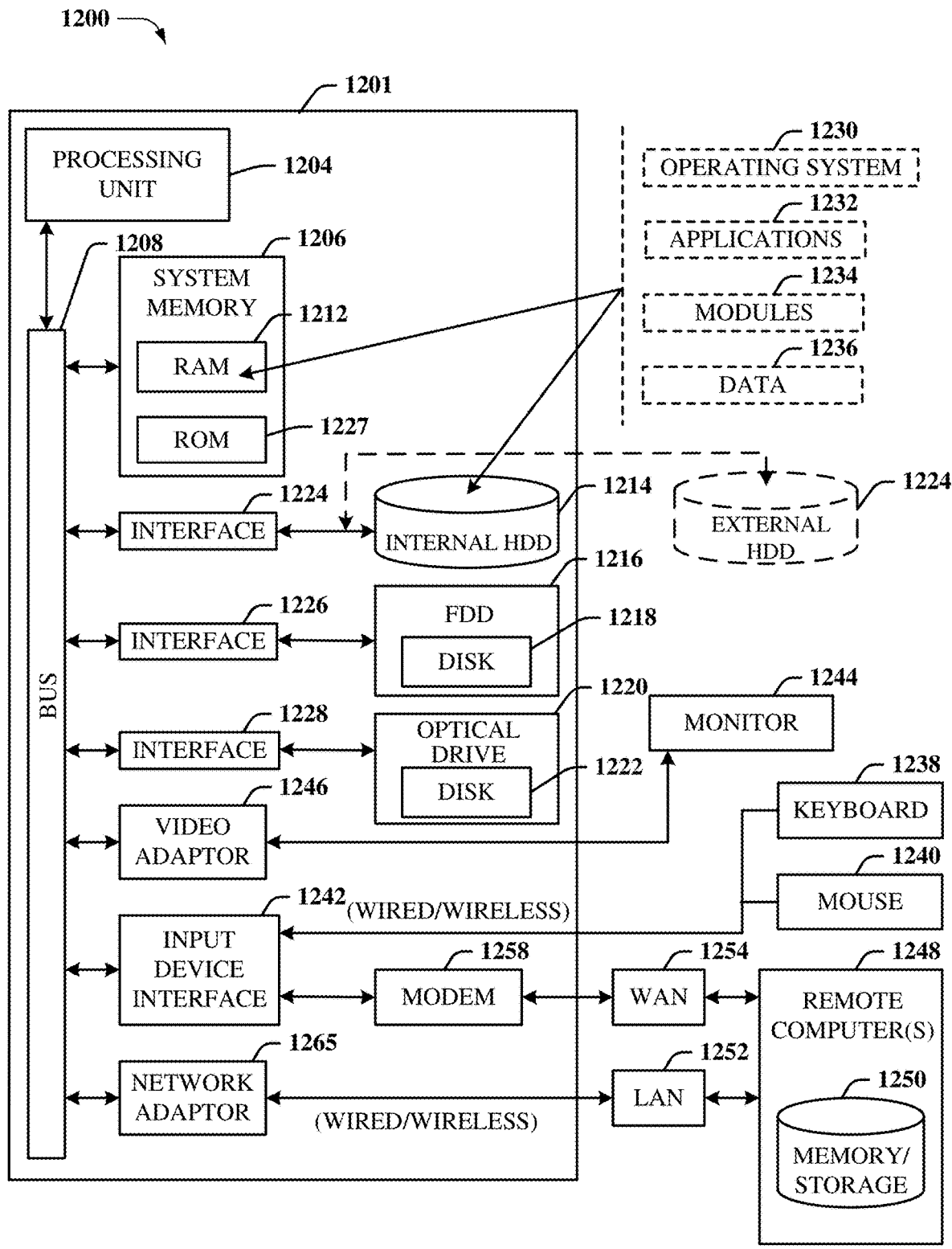
FIG. 12 illustrates an example block diagram of a computer that can be operable to execute processes and methods in accordance with various aspects and embodiments of the subject disclosure.

Referring now to FIG. 12, there is illustrated a block diagram of a computer 1200 operable to execute the functions and operations performed in the described example embodiments. For example, a network node (e.g., network node 406) may contain components as described in FIG. 12. The computer 1200 can provide networking and communication capabilities between a wired or wireless communication network and a server and/or communication device. In order to provide additional context for various aspects thereof, FIG. 12 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1227 and random access memory (RAM) 1212. A basic input/output system (BIOS) is stored in a non-volatile memory 1227 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the various embodiments can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the input device interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprises a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A base station, comprising:
a processor; and
a memory that stores executable instructions that, when executed by the processor, facilitate performance of operations, comprising:
signaling a location for a demodulation reference signal in a data transport data channel, wherein the location identifies a symbol of the data transport data channel in which the demodulation reference signal is located, and wherein the signaling the location further comprises:
selecting a first table of a group of tables, wherein a first symbol index column of the first table indicates the location of the demodulation reference signal in the data transport data channel, and
setting an indicator bit in downlink control information in a control channel that schedules the physical downlink shared channel, wherein the indicator bit is associated with the location for the demodulation reference signal, wherein a first setting of the indicator bit indicates that a master information block in the physical broadcast channel identifies the location of the demodulation reference signal; and
transmitting a beam comprising the data transport data channel.

2. The base station of claim 1, wherein a second setting of the indicator bit indicates that a first symbol of the data transport data channel comprises the demodulation reference signal.

3. The base station of claim 1, wherein signaling the location further comprises:
identifying a resource allocation for the data transport data channel in downlink control information, wherein the demodulation reference signal is located at the resource allocation.

4. The base station of claim 3, wherein the identifying is based on matching a number of bits in the downlink control information to a row in a table of resource allocation locations.

5. The base station of claim 1, wherein signaling the location further comprises:
signaling the location in a master information block in a physical broadcast channel that identifies the location of the demodulation reference signal.

6. The base station of claim 5, wherein the location is based on a time index of the synchronization block associated with the physical broadcast channel.

7. The base station of claim 1, wherein the location of the demodulation reference signal is based on a carrier frequency of the beam.

8. The base station of claim 1, wherein the location of the demodulation reference signal is based on a number of antennas of the base station.

9. A method, comprising:
identifying, by a transmitter device comprising a processor, a location for a demodulation reference signal in a data transport data channel, wherein the location identifies a symbol of the data transport data channel in which the demodulation reference signal is located, and wherein the identifying comprises:
indicating, by the transmitter device, a selection of a table of a group of tables, wherein a first symbol index column of the table indicates the location of the demodulation reference signal in the data transport data channel, and
setting, by the transmitter device, an indicator bit in downlink control information in a control channel that schedules the data transport data channel, wherein the indicator bit is associated with the location for the demodulation reference signal, wherein a first setting of the indicator bit indicates that a master information block in a physical broadcast channel identifies the location of the demodulation reference signal; and
transmitting, by the transmitter device, a beam comprising the data transport data channel.

10. The method of claim 9, wherein a second setting of the indicator bit indicates that a first symbol of the data transport data channel comprises the demodulation reference signal.

11. The method of claim 9, wherein the identifying further comprises:
indicating a resource allocation for the data transport data channel in downlink control information, wherein the demodulation reference signal is located based on the resource allocation.

12. The method of claim 9, wherein the location is based on a time index of the synchronization signal block associated with a physical broadcast channel.

13. The method of claim 9, wherein the location of the demodulation reference signal is based on a carrier frequency of the beam.

14. The method of claim 9, wherein the location of the demodulation reference signal is based on a number of antennas of the transmitter device.

15. A non-transitory machine-readable medium, comprising executable instructions that, when executed by a processor of a device, facilitate performance of operations, comprising:
signaling a location for a demodulation reference signal in a physical downlink shared channel, wherein the location identifies a symbol of the physical downlink shared channel in which the demodulation reference signal is located, and wherein the signaling comprises:
indicating a selection of a table of a group of tables, wherein a first symbol index column of the table indicates the location of the demodulation reference signal in the data transport data channel, and
setting an indicator bit in downlink control information in a control channel that schedules the physical downlink shared channel, wherein the indicator bit is associated with the location for the demodulation reference signal, wherein a first setting of the indicator bit indicates that a master information block in the physical broadcast channel identifies the location of the demodulation reference signal; and
transmitting a beam comprising the physical downlink shared.

16. The non-transitory machine-readable medium of claim 15, wherein
a second setting of the indicator bit indicates that a first symbol of the physical downlink shared channel comprises the demodulation reference signal.

17. The non-transitory machine-readable storage medium of claim 15, wherein the signaling further comprises:

indicating a resource allocation for the data transport data channel in downlink control information, wherein the demodulation reference signal is located according to the resource allocation.

18. The non-transitory machine-readable medium of claim 15, wherein the location is based on a time index of the synchronization signal block associated with the physical broadcast channel.

19. The non-transitory machine-readable medium of claim 15, wherein the location of the demodulation reference signal is based on a carrier frequency of the beam.

20. The non-transitory machine-readable medium of claim 15, wherein the location of the demodulation reference signal is based on a number of antennas of the device.

* * * * *